(12) United States Patent
Schlöndorf et al.

(10) Patent No.: US 7,127,803 B2
(45) Date of Patent: Oct. 31, 2006

(54) DEVICE FOR HANDLING AN ELASTIC PROTECTIVE BELLOWS AND MOUNTING PROCESS FOR ARRANGING A PROTECTIVE BELLOWS ON A COMPONENT

(75) Inventors: Hermann Schlöndorf, Sulingen (DE); Michael Jürgens, Stemwede-Wehdem (DE); Werner Wehming, Damme (DE); Rolf Husmann, Barver (DE)

(73) Assignee: ZF Lemförder Metallwaren AG (DE)

( * ) Notice: Subject to any disclaimer, the term of this patent is extended or adjusted under 35 U.S.C. 154(b) by 0 days.

(21) Appl. No.: 11/172,498

(22) Filed: Jun. 30, 2005

(65) Prior Publication Data

US 2005/0241132 A1 Nov. 3, 2005

Related U.S. Application Data

(63) Continuation of application No. PCT/DE2004/01540, filed on Jul. 15, 2004.

(30) Foreign Application Priority Data

Jul. 18, 2003 (DE) ................ 103 32 992

(51) Int. Cl.
*B23P 19/08* (2006.01)
(52) U.S. Cl. ............... 29/717; 29/235; 29/283; 29/243.517; 29/450
(58) Field of Classification Search .......... 29/283, 29/454, 235, 717, 243.5, 718, 715, 243.517, 29/450, 451, 453
See application file for complete search history.

(56) References Cited

U.S. PATENT DOCUMENTS

| | | | |
|---|---|---|---|
| 3,393,440 A | * | 7/1968 | Wilson .................... 29/235 |
| 4,685,686 A | | 8/1987 | Weiler |
| 4,782,573 A | * | 11/1988 | Le Floch .................... 29/235 |
| 4,815,187 A | * | 3/1989 | Rettig et al. ............... 29/235 |
| 4,884,327 A | * | 12/1989 | Nagatsuma et al. ........ 29/235 |
| 5,008,994 A | | 4/1991 | Rettig et al. |
| 5,457,865 A | | 10/1995 | Iijima |
| 6,725,530 B1 | * | 4/2004 | Yamamoto et al. .......... 29/717 |

FOREIGN PATENT DOCUMENTS

| | | |
|---|---|---|
| DE | 87 221 | 1/1972 |
| DE | 36 02 867 | 8/1987 |
| DE | 39 08 864 | 10/1989 |
| DE | 39 25 803 | 2/1991 |
| EP | 0 934 840 | 8/1999 |

* cited by examiner

*Primary Examiner*—David P. Bryant
*Assistant Examiner*—Christopher M. Koehler
(74) *Attorney, Agent, or Firm*—McGlew and Tuttle

(57) ABSTRACT

A mounting device and process are provided for arranging a protective bellows on a component. The device includes a basic body, a mounting head, which is displaceable at the basic body, an adjusting device for providing an adjusting action and including an electromechanical drive and a position recognition system and gripping elements movable. The gripping elements include gripping arms and clamping fingers movable in relation to the gripping arms. The process includes bringing the gripping arms of the device into contact with the inner surface of a collar of the protective bellows and fixing the collar by the clamping fingers. The collar is expanded in preparation for the mounting and then released by loosening the clamping fingers such that the collar of the protective bellows jumps into a recess provided on the component as a consequence of its intrinsic elasticity after the necessary positioning of the protective bellows in relation to the component to be protected has been established.

8 Claims, 3 Drawing Sheets

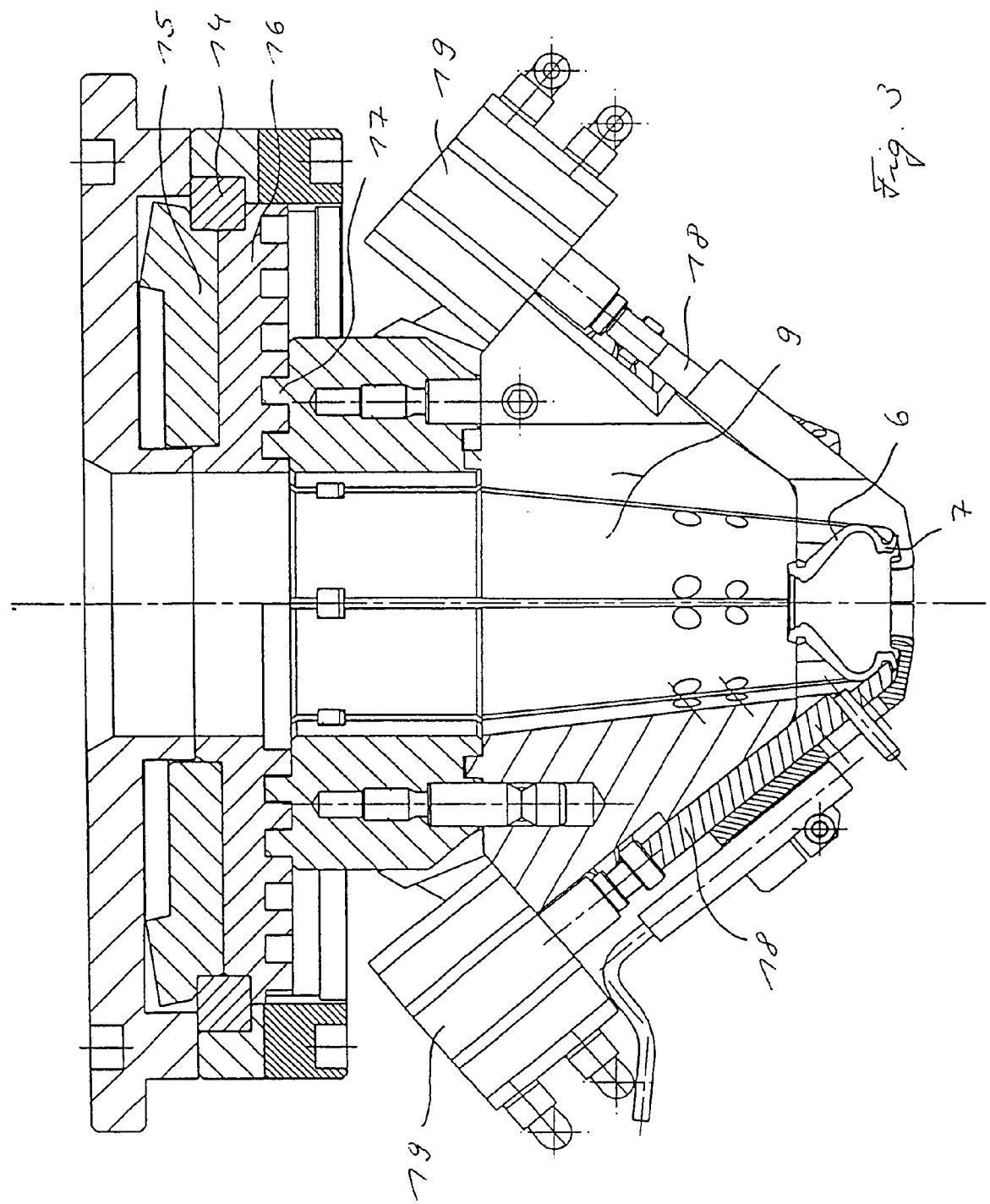

DEVICE FOR HANDLING AN ELASTIC PROTECTIVE BELLOWS AND MOUNTING PROCESS FOR ARRANGING A PROTECTIVE BELLOWS ON A COMPONENT

CROSS REFERENCE TO RELATED APPLICATION

This is a continuation of and claims the benefit (35 U.S.C. §120 and 365(c)) of copending International Application PCT/DE 2004/001540 of Jul. 15, 2004, which designated inter alia the United States and which claims the priority of German Application DE 103 32 992.7 of Jul. 18, 2003. The entire contents of each application is hereby incorporated by reference in its entirety.

FIELD OF THE INVENTION

The present invention pertains to a process for handling an elastic protective bellows, especially a mounting process for arranging a protective bellows on a component, in which gripping arms of a mounting device are brought into contact with the inner surface of a collar of the protective bellows and clamping fingers fix the collar from the outside and to a device suitable for carrying out the process with a mounting head displaceable at a basic body, at which gripping elements are arranged in such a way that they are movable and their position can be changed by means of an adjusting means.

BACKGROUND OF THE INVENTION

The need to provide components with elastic protective bellows arises, as a rule, from the requirement that the unrestricted ability of these components to function must be maintained over a comparatively long period of time. This is of particular significance for components that are connected with one another and whose positions in relation to one another can be changed, as they are used, among other things, in motor vehicles in the area of the drive and the chassis. Since the parameters of protective bellows for a certain intended use frequently vary, it is desirable to use mounting devices adapted to the range of variation of the protective bellows.

A device for arranging a rubber-elastic bellows on a rolling stamp of a motor vehicle air spring is known from EP 0 934 840 A2. A counterstamp, which acts on the end of the bellows located opposite the rolling stamp, is an essential component of this device, both stamps being sealingly in contact with the ends of the bellows, so that the relative movement of the stamps, which are directed toward one another, generates an overpressure, which can be amplified by an additional pressure source. As a result of such a force action on the rubber-elastic bellows, a beaded ring of the air bellows is expanded and displaced into the groove of the rolling stamp and consequently into its position of use.

Such a solution is associated with the drawback that the tool described, whose handling is relatively complicated, is suitable for special rubber-elastic bellows only.

Furthermore, an automatic mounting device for premounting ring-shaped parts on parts with hollow parts made of an elastic material and for mounting the latter on other parts is known from the patent specification DE 87 2321. An outer cylinder, which carries pivotable jaws, which can engage an opening of the preform for expanding same in this area, is arranged displaceably in the housing of the device. The mounting device is designed for integration in a fully automatic mounting process. A special design of the jaws, which is designed for handling the collar areas of the parts consisting of an elastic material in the correct position, is not provided for in this solution.

SUMMARY OF THE INVENTION

The basic object of the present invention is to achieve reliable handling of a protective bellows with comparatively simple means and to guarantee on this basis positioning as intended on a component to be protected.

According to the present invention a device is provided for handling an elastic protective bellows, preferably for fixing same on a component for protection from external effects and/or for guaranteeing the function of the component as intended. The device has a mounting head, which is displaceable at a basic body and at which gripping elements are arranged for handling a collar area of the protective bellows in such a way that they are movable and their position can be changed by means of an adjusting means. The gripping elements are designed as gripping arms and as clamping fingers which are guided in the gripping arms and are movable in relation to these and by the movements of all gripping elements taking place simultaneously essentially at right angles to the direction of movement of the mounting head by the change in position of the gripping elements in relation to the mounting head being brought about by an electromechanical drive and detected by a position recognition system.

The present invention is associated with the advantage that the handling of protective bellows of different dimensions is also possible on the basis of the position recognition system and the gripping elements that can be freely positioned by means of the drive.

In an advantageous embodiment of the present invention, the adjusting means has a rotatable adjusting element, which cooperates with adjusting segments of the gripping arms to achieve a translatory movement of the gripping arms, which movement is guided in the mounting head. The adjusting element may have a helically structured active surface which extends in one plane and with which corresponding structures of the adjusting segments of the gripping arms are in functional connection.

For adaptation to the space available for installation and to change the direction of the force of the drive, a circular disk, which is mounted in the mounting head and whose teeth, provided on the outer circumference, mesh with a gear of the electromechanical drive, so that the rotary movement of the gear leads to rotation of the circular disk with an axis of rotation deviating from the axis of rotation of the gear, is preferably used as the adjusting element.

In another embodiment of the present invention, the position recognition system comprises an incremental measurement transducer, a memory component and a measured value processing unit, in which the current position of the gripping arms of the mounting head is determined on the basis of the measured data and algorithms stored in the memory component and sent to a control and regulating means, which provides corresponding information for position correction for the drive in case of disagreement of the position data after comparison of the position with the desired position of the gripping arms.

To achieve fast adaptation to a changed handling of protective bellows, the characteristics of the protective bellows in question and of the component to be provided with the protective bellows are preferably recorded in the memory component and can be accessed under a code number.

For an indirect determination of the position of the gripping arms, it is possible for the incremental measurement transducer to detect the angle of rotation of rotating components of the electromechanical driveline and for algorithms for determining the functional dependence of the position of the gripping arms at the mounting head on the angle of rotation of the component in question to be stored in the memory component.

In another advantageous embodiment of the present invention, the device has a receiving body, which receives the component, which is to be provided with the protective bellows and carries a mounting sleeve and the protective bellows prepositioned on the mounting sleeve. The component and the protective bellows can be protected from being damaged by the mounting sleeve during the mounting process. To facilitate the handling of the protective bellows, the mounting sleeve may have such a shape that a sufficiently large free space is formed for the positioning of the gripping arms at the collar of the protective bellows.

The object of the present invention is accomplished, furthermore, by a mounting process for arranging a protective bellows on a component, with a device including a basic body, a mounting head, which is displaceable at the basic body, an adjusting means for providing an adjusting action and including an electromechanical drive and a position recognition systme and gripping elements arranged at the mounting head for handling a collar area of the protective bellows in such a way that the gripping elements are movable and a position of the gripping elements can be changed by the adjusting means, the gripping elements including gripping arms and clamping fingers, guided in the gripping arms and movable in relation to the gripping arms, with movement of all the gripping elements made possible simultaneously and essentially at right angles to the direction of movement of the mounting head by change in position of the gripping elements in relation to the mounting head brought about by the electromechanical drive and detected by the position recognition system, and by the collar of the protective bellows being expanded by means of the gripping arms by a certain amount determined by the change in the contour or position of the collar and by the collar being thereupon fixed by changing the position of the clamping fingers between the latter and the gripping arms and by the collar being subsequently brought to the width necessary for mounting in the fixed state.

According to another aspect of the invention, a mounting process is provided for arranging a protective bellows on a component, preferably with the use of a device of the invention, in which said gripping arms of a mounting device are brought into contact with the inner surface of a collar of the protective bellows. The collar is fixed by the clamping fingers, and the collar is expanded in preparation for the mounting. The collar of the protective bellows, which is released by loosening the clamping fingers, jumps into the recess provided on the component as a consequence of its intrinsic elasticity after the necessary positioning of the protective bellows in relation to the component to be protected has been established. The process is associated with the advantage that depending on the contour of the collar of the protective bellows, a suitable point in time can be selected at which the clamping fingers fix the protective bellows between the clamping fingers and the gripping arms.

In the preferred execution of the process, the expansion of the collar of the protective bellows in the fixed state is reduced to the extent that after releasing the clamping fingers, a predetermined contour or position of the collar is given or becomes established, so that the reduction in the diameter of the collar, which is brought about by the intrinsic elasticity, leads to a defined seating of the collar in the recess of the component.

To create a defined initial state during the handling of the protective bellows, it may be desirable to pretension the protective bellows when the gripping arms are in contact with the front side of its collar by moving the gripping arms in the longitudinal direction of the protective bellows after the radial insertion of the gripping arms into the interior space of the collar of the protective bellows, after which the expansion of the collar of the protective bellows begins with the gripping arms in the pretensioned state.

In another advantageous embodiment of the process, the gripping arms are positioned by an electromechanical drive and the clamping fingers are guided in the gripping arms and are actuated pneumatically.

The present invention shall be explained in greater detail below on the basis of an exemplary embodiment and the corresponding drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 is a view showing a device according to the present invention with a protective bellows prepositioned on a mounting sleeve;

FIG. 3 is an enlarged sectional view of the mounting head according to FIG. 2, in which the sectional view of the gripping element comprising the gripping arm and the clamping finger is shown.

DESCRIPTION OF THE PREFERRED EMBODIMENT

Figure 7:
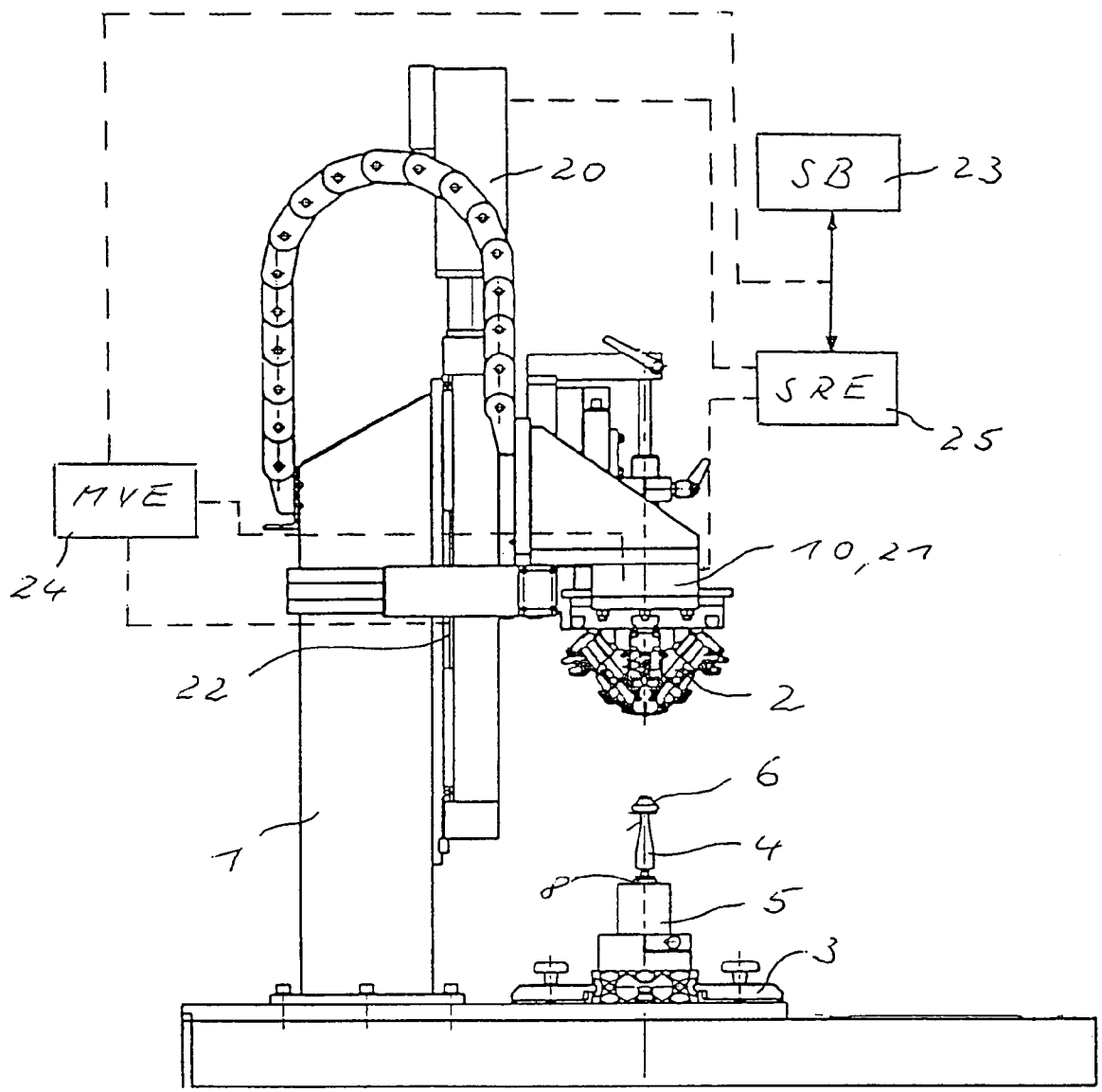

The device for mounting a protective bellows according to FIG. 1, which will be described below as an example, comprises essentially a basic body 1, a mounting head 2, which can be displaced at the basic body 1 by a translatory movement, and a receiving body 3, which carries a component 5 (here a chassis component) of a motor vehicle, which is provided with a mounting sleeve 4. A protective bellows 6, whose collar 7 is intended to be displaced by the mounting head 2 into a groove 8 of the chassis component 5, is prepositioned on the mounting sleeve 4.

Figure 2:
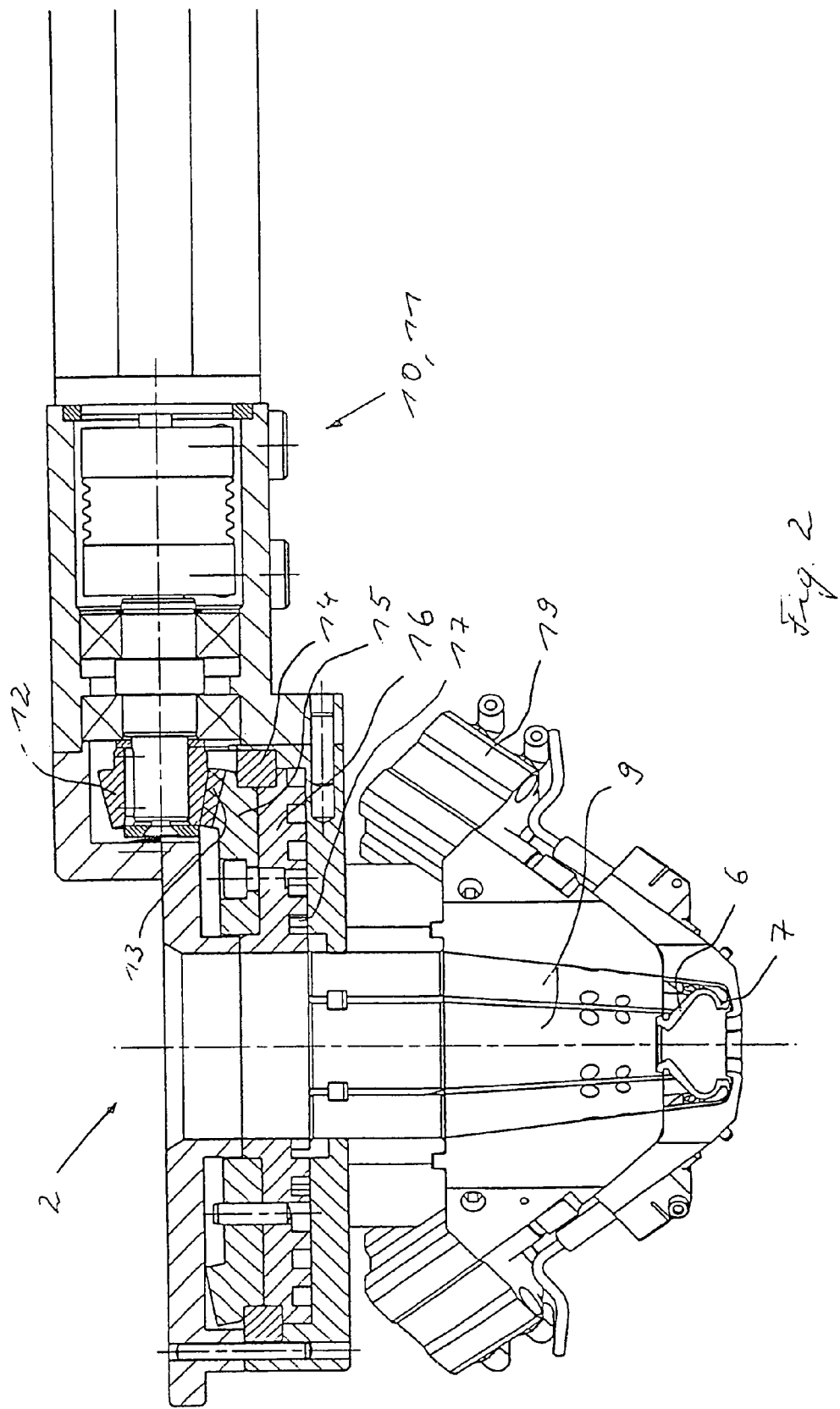
FIG. 2 is a sectional view of a mounting head of a device according to the present invention with electric motor drive of the gripping arms of the mounting head and pneumatic drive of the clamping fingers cooperating with the gripping arms.

The mounting head 2 slides in guides arranged on the basic body 1 in the longitudinal direction of the protective bellows 6 and has, as is shown in detail in FIGS. 2 and 3, a number of gripping arms 9, which are arranged at right angles to the longitudinal direction of the protective bellows 6 in guides of the mounting head 2 in such a way that the position can be changed radially. The change in the position of the gripping arms 9 in relation to one another and to the mounting head 2 is brought about by an electric motor drive 10, which drives a pinion 12 via a coupling 11.

The pinion 12 meshes with teeth 13 with a circular disk 15, which is rotatable in a plain bearing 14 and has a structure 16 designed as a helical elevation on its side facing away from the teeth 13. The helical structure 16 of the circular disk 15 is engaged by a structure 17, which is connected with the gripping arms 9 and corresponds to the structure 16 of the circular disk 15, so that the rotation of the circular disk 15 brought about by the electric motor drive 10 leads to a combined radial movement of the gripping arms 9, i.e., to a radial movement acting simultaneously on all gripping arms 9.

Clamping fingers 18 are mounted in the gripping arms 9. The clamping fingers 18 are displaceable in relation to the gripping arms 9 by a pneumatic drive 19 and make possible the clamping of the collar 7 of a protective bellows 6 when the clamping fingers 18 approach the gripping arms 9.

To exactly position the mounting head 2 in relation to the protective bellows 6, the electric motor drive 10 and another electric motor drive 20, are equipped with an incremental position transducer system 21 and 22, respectively. The electric motor drive 20 is provided for the translatory movement of the mounting head 2 at the basic body 1. The translatory movement of the mounting head 2 at the basic body 1 and the radial movement of the gripping arms 9 at the mounting head 2, which is directed at right angles to this translatory movement, make it possible to reach any position of the gripping arms 9 that is necessary for the exact fastening of the protective bellows 6 on the chassis component 5 as a result of the superimposition of the two movements.

A storage component 23 and a measured value processing unit 24, in which the current position of the gripping arms 9 of the mounting head 2 is determined on the basis of the measured data and the algorithms stored in the memory component 23 and sent to a control and regulating means 25, are used for this purpose besides the incremental position transducer systems 21 and 22. The control and regulating means 25 then provide corresponding information for the electric motor drives for position correction 10 and 20 in case of disagreement of the position data after comparison of the position with the desired position of the gripping arms 9.

In preparation for the mounting of the protective bellows 6 on the chassis component 5, the protective bellows 6 is attached to the mounting sleeve 4 located on the chassis component 5. A mounting sleeve 4 is preferably used whenever the chassis component 5 and/or the protective bellows 6 are to be protected from being damaged during mounting or the conditions for grasping the protective bellows 6 by the mounting head 2 are to be improved.

To mount the protective bellows 6, the mounting head 2 is brought by means of the electric motor drive 20 into a position in which the gripping arms 9 being moved by the electric motor drive 10 can be displaced radially inwardly to the extent that the protective bellows 6 is pretensioned during an axial movement of the mounting head 2, which movement is directed against the collar 7 of the protective bellows 6, and the end areas of the gripping arms 9 engage the interior space of the collar 7 of the protective bellows 6. The radially outwardly directed movement of the gripping arms 9, which follows this, brings the end areas of the gripping arms into contact with the inner sides of the collar 7 of the protective bellows 6 and leads to the expansion of the collar 7 during the further course of the movement.

In a certain state of expansion of the collar 7, which is characterized by a stable, optionally positive-locking contact of the contour of the collar 7 with the end areas of the gripping arms 9, the clamping fingers 18 are displaced by means of the pneumatic drive 19 such that secure fixation of the collar 7 takes place between the end areas of the gripping arms 9 and the clamping fingers 18.

The collar 7 is subsequently brought to the width necessary for the mounting by an additional, outwardly directed radial movement of the gripping arms 9.

The mounting head 2 is then moved into the mounting position, and the radial expansion of the collar 7 is to be reduced to the extent that defined conditions will occur for the transition of the collar 7 into the groove 8 of the chassis component 5. The clamping fingers 18 are released in the mounting position brought about in this manner, so that the collar 7 of the protective bellows 6 will be able to be displaced from the end areas of the gripping arms 9 into the groove 8 of the chassis component 5.

The mounting head 2 then moves away from the chassis component 5 provided with the protective bellows 6 into a starting position, from which it is available for a new mounting process. After removing the mounting sleeve 4, the chassis component 5 complemented with the protective bellows 6 can be removed from the device.

The device according to the present invention offers the advantage of embodying a continuous movement process of the mounting head, which can be carried out in discrete path sections, especially during the handling of the collar of the protective bellows to complement the component in question. Furthermore, comparatively short cycle times can be reached due to the specific selection of electric and pneumatic drives and the superimposition of the axial movement of the mounting head to the radial movement of the gripping arms of the mounting head. The adaptation to different protective bellows and to components to be provided with protective bellows can be carried out without the replacement of components of the device, e.g., the mounting head or the components thereof, simply by modifying the programs and algorithms stored in the control unit of the device.

While a specific embodiment of the invention has been shown and described in detail to illustrate the application of the principles of the invention, it will be understood that the invention may be embodied otherwise without departing from such principles.

APPENDIX

List of Reference Numbers:

| | |
|---|---|
| 1 | Basic body |
| 2 | Mounting head |
| 3 | Receiving body |
| 4 | Mounting sleeve |
| 5 | (Chassis component) component |
| 6 | Protective bellows |
| 7 | Collar |
| 7 | Groove |
| 9 | (Gripping arm) gripping element |
| 10 | Drive |
| 11 | Coupling |
| 12 | (Pinion) gear |
| 13 | Teeth |
| 14 | Plain bearing |
| 15 | (Circular disk) adjusting element |
| 16 | (Structure) active surface |
| 17 | (Structure) active surface |
| 18 | (Clamping finger) gripping element |
| 19 | Drive |
| 20 | Drive |
| 21 | (Position transducer system) measurement transducer |
| 22 | (Position transducer system) measurement transducer |
| 23 | Storage component |
| 24 | Measured value processing unit |
| 25 | Control and regulating means |

What is claimed is:

1. A device for handling an elastic protective bellows, for fixing same on a component for protection from external effects and/or for guaranteeing the function of the component as intended, the device comprising:
    a basic body;
    a mounting head, which is displaceable at said basic body;
    an adjusting means for providing an adjusting action and including an electromechanical drive and a position recognition system; and
    gripping elements arranged at said mounting head for handling a collar area of the protective bellows in such a way that said gripping elements are movable and a position of said gripping elements can be changed by said adjusting means, said gripping elements including gripping arms and clamping fingers, guided in said gripping arms and movable in relation to said gripping arms, with movement of all said gripping elements made possible simultaneously and essentially at right angles to the direction of movement of the mounting head by change in position of said gripping elements in relation to said mounting head brought about by said electromechanical drive and detected by said position recognition system.

2. A device in accordance with claim 1, wherein said adjusting means has a rotatable adjusting element, which cooperates with adjusting segments of said gripping arms to achieve a translatory movement of said gripping arms, which said translatory movement is guided in said mounting head.

3. A device in accordance with claim 2, wherein said adjusting element has a helically structured active surface, which extends in one plane and with which said corresponding structures of adjusting segments of said gripping arms are in functional connection.

4. A device in accordance with claim 2, wherein said rotatable adjusting element comprises a circular disk mounted in said mounting head and having teeth provided on an outer circumference that mesh with a gear of said electromechanical drive, said gear being arranged in relation to said circular disk such that an axis of rotation deviates from an axis of rotation of said gear.

5. A device in accordance with claim 1, wherein said position recognition system comprises an incremental measurement transducer, a memory component and a measured value processing unit, in which a current position of said gripping arms of said mounting head is determined on the basis of measured data and algorithms stored in said memory component and sent to a control and regulating means, so that corresponding information for position correction is provided for said electromechanical drive in case of a disagreement of the position data after comparison of the position with the desired position of the gripping arms.

6. A device in accordance with claim 5, wherein characteristics of the protective bellows and of the component to be provided with the protective bellows are recorded in said memory component and can be accessed under a code number.

7. A device in accordance with claim 5, wherein said incremental measurement transducer detects an angle of rotation of rotating components of the electromechanical drive, and algorithms for determining the functional dependence of the position of the gripping arms at the mounting head on the angle of rotation of the component in question are stored in said memory component.

8. A device in accordance with claim 1, further comprising a receiving body, which receives the component, which is to be provided with the protective bellows and which carries a mounting sleeve and the protective bellows prepositioned on the mounting sleeve.

* * * * *